United States Patent [19]

Fuma et al.

[11] Patent Number: 4,623,499

[45] Date of Patent: Nov. 18, 1986

[54] METHOD FOR MANUFACTURE OF SHAPED ARTICLE OF ORGANIC SUBSTANCE

[75] Inventors: Toyoji Fuma; Kazuyuki Nishikawa, both of Toyokawa; Naoshi Makiguchi, Aichi; Katsuya Nagano; Yoshio Nakayama, both of Okazaki; Hiroyuki Sasaki, Okazaki, all of Japan

[73] Assignees: Nihon Sekiso Kogyo Co., Ltd.; Sintokogio Ltd., both of Nagoya, Japan

[21] Appl. No.: 639,172

[22] Filed: Aug. 9, 1984

[51] Int. Cl.[4] ............................................. B29C 35/18

[52] U.S. Cl. ....................................... 264/83; 264/87; 264/101; 264/122; 264/123; 523/129; 523/15

[58] Field of Search ................. 264/101, 136, 83, 128, 264/87, 236, 82, DIG. 69, 109, 134, 135; 425/812; 523/129; 524/15

[56] References Cited

U.S. PATENT DOCUMENTS

| | | | |
|---|---|---|---|
| 2,850,786 | 9/1958 | Dubbs | 264/101 |
| 2,976,164 | 3/1961 | Glab | 264/83 |
| 2,984,579 | 5/1961 | Glab | 264/83 |
| 3,008,205 | 11/1961 | Blaies, Jr. | 264/83 |
| 3,086,248 | 4/1963 | Culp | 264/101 |
| 3,619,450 | 11/1971 | Futo | 264/83 |
| 3,686,383 | 8/1972 | Makinen | 264/83 |
| 3,699,202 | 10/1972 | Verbestel | 264/83 |
| 3,891,738 | 6/1975 | Shen | 264/101 |

OTHER PUBLICATIONS

Chem. Abstracts, vol. 98, 55751, 1983, Blegen et al.
Chem. Abstracts, vol. 83, 181159, 1975, Taft et al.

*Primary Examiner*—Jeffery Thurlow
*Attorney, Agent, or Firm*—Armstrong, Nikaido, Marmelstein & Kubovcik

[57] ABSTRACT

A method for manufacturing shaped articles of organic substance is disclosed, which comprises mixing an organic substance as raw material with a binder, filling a die with the resultant binder-containing mixture, compressing the mixture in a prescribed shape in the die, and forcing a gaseous curing agent through the compressed mixture thereby curing the binder in the mixture and consequently solidifying the compressed mass. This method enables shaped articles such as noise absorbers, heat insulation panels, and plate materials to be produced efficiently and inexpensively at low energy consumption by the use of an inexpensive die.

2 Claims, 1 Drawing Figure

METHOD FOR MANUFACTURE OF SHAPED ARTICLE OF ORGANIC SUBSTANCE

BACKGROUND OF THE INVENTION

1. Field of the Invention

This invention relates to a method for the manufacture of shaped articles of an organic substance.

2. Description of the Prior Art

The shaped articles produced from organic substances as raw materials find extensive utility in numerous fields. For example, shaped materials, noise absorbers, and heat insulation panels are used in automobiles, buildings, and electric appliances and cushioning materials are used for protection of various packages. The term "organic substance" as used herein means waste fibers arising from textile products such as articles of clothing, fibers arising from used paper, synthetic fibers, natural fibers, and pulp fibers. Wood flour, ground rice hulls, powdered pulp, chips, flakes, and other similar small particles are also usable as raw materials.

The methods heretofore adopted for the manufacture of shaped articles of organic substances may be broadly classified under wet methods and dry methods. A typical wet method comprises the steps of casting a pulp suspension in a metal die capable of removing water by suction, pressing the pulp suspension with a rubber pack thereby squeezing water therefrom and, at the same time, preforming the drained pulp, then drying the preformed mass of pulp by means of hot air or high frequency or compression drying the drained mass of pulp in a heated die. A typical dry method comprises blowing current of hot air through a mixture of pulp and thermoplastic resin or thermosetting resin thereby half burning the mixture and, at the same time, fleece molding it, and then completely burning the molded mixture by additional heating or by being compression heated in a heated metal die. These conventional shaping methods suffer from various problems. The wet method is disadvantageous in that the metal die has a complicate structure because it is required to be provided with numerous fine through holes for permitting passage of water and steam, that the metal die for compression drying entails consumption of large amount of thermal energy because it is heated to a temperature of 200° to 250° C., that the operation of the metal die which exposes the metal die to compressive force of 15 to 50 kg/cm$^2$ necessitates provision of a large compression device, and that the molding work takes up so much time as to impair the productivity of the method to a great extent. The dry method is also disadvantageous in that the process of fleece molding consumes a large volume of hot air kept at a temperature of about 200° C., that similarly to the wet method, the operation of the metal die for complete burning uses up a large volume of thermal energy because the metal die is heated to a temperature of 200° to 250° C., and that the operation of the metal die which exposes the metal die to compressive force of 15 to 50 kg/cm$^2$ necessitates provision of a large compression device.

SUMMARY OF THE INVENTION

An object of this invention is to provide a method for the manufacture of shaped articles of an organic substance, which enables shaped articles such as noise absorbers, heat insulation panels, and plate materials to be produced from organic substances efficiently and inexpensively at low energy consumption by the use of an inexpensive die of simple structure.

The present invention, therefore, resides essentially in a method which comprises mixing an organic substance given as raw material with a binder, filling a die with the binder-containing mixture, compressing the mixture in a prescribed shape within the die, and forcing a fluid curing agent through the compressed mixture thereby solidifying the organic substance contained therein.

The other objects and characteristics of this invention will become apparent from the further disclosure of this invention to be made in the following detailed description of a preferred embodiment, with reference to the accompanying drawing.

DESCRIPTION OF PREFERRED EMBODIMENT

Figure 1:
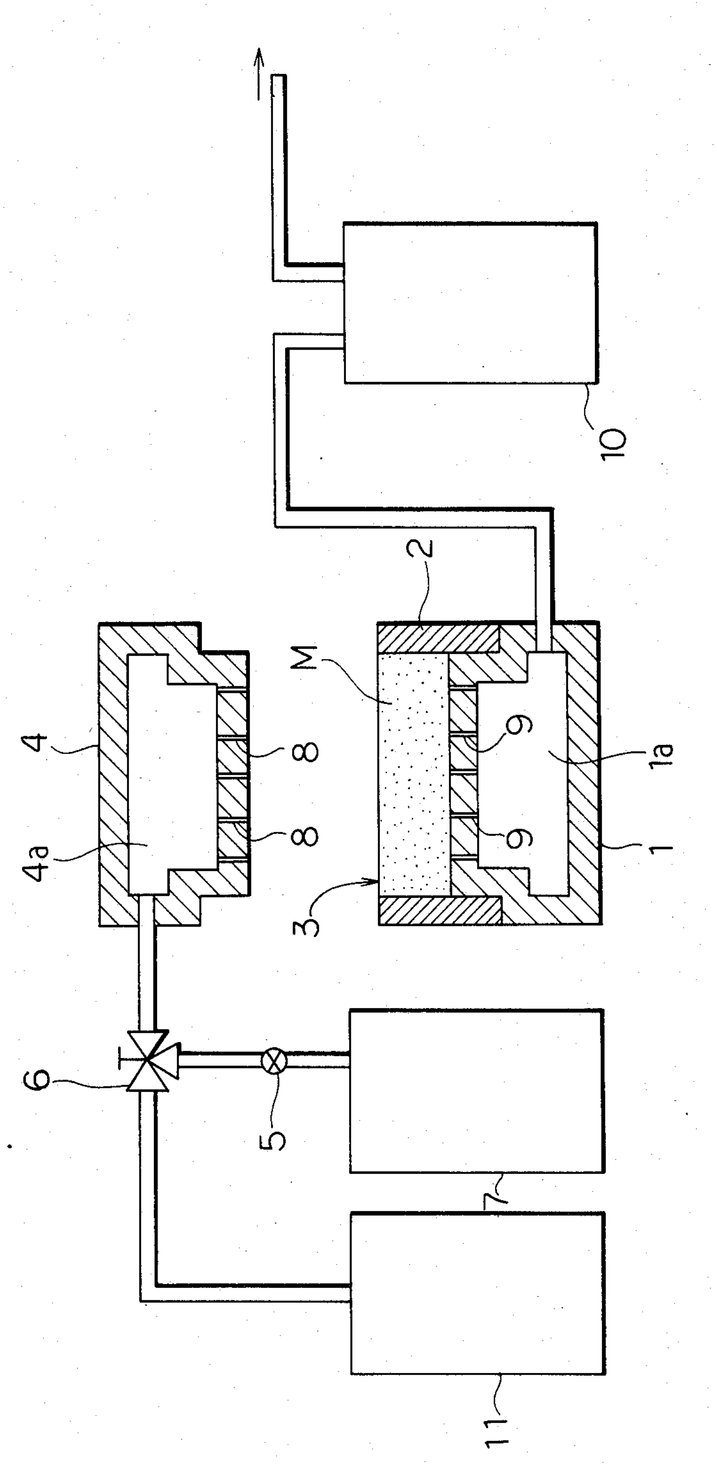
FIG. 1 is a schematic diagram illustrating the construction of an apparatus to be used for working the present invention.

Now, one preferred embodiment of this invention will be described with reference to the accompanying drawing.

FIG. 1 illustrates the construction of an apparatus for producing shaped articles of an organic substance. In the diagram, 1 denotes a lower die provided internally with a hollow chamber 1*a*. A frame member 2 is fitted around the upper portion of the lower 1 to enclose a cavity 3 therein. What serves as a partition between the cavity 3 and the hollow chamber 1*a* is perforated with a plurality of ventholes 9. The hollow chamber 1*a* communicates with a vacuum pump not shown in the diagram via a neutralizing tank 10 by pipes. By 4 is denoted an upper die fastened to a movable base not shown in the diagram. The upper die has a hollow chamber 4*a* formed therein and has a lower wall thereof perforated with ventholes 8 communicating with the hollow chamber 4*a*. The hollow chamber 4*a* of the upper die 4 communicates with a curing agent feed device 7 and a compressed air source 11 via a three-way switch valve 6 by means of pipes.

Now, the binder and its curing agent to be used for solidifying a shaped article of organic substance will be described.

Examples of the binder and its curing agent advantageously used herein are as follows. In the case of a binder which is made of polyol and/or isocyanate resin, an amine type curing agent is used in the form of gas or aerosol and the curing is effected by a urethanizing reaction.

Now, the method of shaping according to the present invention will be described with reference to the drawing. First, in a mixer, a fibrous substance such as synthetic fibers, natural fibers, or pulp fibers, a powdery substance such as wood flour or pulp powder, and chips, flakes, or a mixture thereof are mixed with a stated binder for a prescribed length of time to produce a binder-containing mixture M. This mixture M is placed to fill the cavity 3 which is defined by the lower die 1 and the frame member 2.

Then, the upper die 4 is lowered and pressed down into the cavity 3 to compress the mixture M with stated pressure. In the resultant state, the switch valve 5 is opened and the three-way switch valve 6 is manipulated to introduce the gas or aerosol of curing agent issuing from the curing agent feed device 7 into the hollow chamber 4*a* of the upper die 4 and, at the same time, the vacuum pump (not shown) is set rotating to evacuate the hollow chamber 1*a* of the lower die 1. Consequently, the curring agent held inside the hollow chamber 4*a* finds its way through the ventholes 8 of the upper die 4 into the cavity 3 and then permeates the mixture M. At this time, the curing agent in the form of gas or aerosol acts on the binder in the mixture M and cures it, with the result that the mixture is solidified. The curing agent in the form of gas or aerosol which is discharged via the ventholes 9 of the lower die 1 into the hollow chamber 1*a* is passed through the neutralizing tank 10, there to be neutralized. Then it is released into the atmosphere through the vacuum pump.

Subsequently, the switch valve 5 is closed and the three-way switch valve 6 is manipulated to establish communication between the hollow chamber 4*a* and the compressed air source 11 and purge the mixture M in the cavity 3 by passage therethrough of the compressed air. Consequently, a shaped article of organic substance is obtained.

The shaped articles of organic substances are required to possess strength, density, water resistance, heat resistance, and inflammability at varying levels depending on applications in which they are put to use. These properties can be adjusted by suitably selecting organic substances as raw materials by their kind and form, the kind and application rate of binders, and the magnitude of compressive force used during the shaping.

Concerning strength, the strength of the shaped article tends to increase in proportion as the amount of an organic substance increases relative to the amount of a powdery substance and further in proportion as the length of fibers in a fibrous substance increases. As regards the kind of binder, the strength is greater when urethane resin or isocyanate resin is used as a binder than when sodium silicate is used. The strength also increases in proportion as the amount of a given binder is increased. The strength of the mixture of the organic substance with the binder increases in proportion as the compressive force exerted thereon is increased. In the manufacture of such a shaped article as the noise arrester, the noise absorber, the heat insulation material, or the shock absorber, since neither high strength nor high density is required, the compressive force exerted upon the mixture may be decreased to the lowest extent at which the mixture in the die will be neatly shaped.

The water resistance, the heat resistance, and the inflammability of the produced shaped article hinge heavily on the kind of binder to be used.

Ample attention must be paid to the flow of the curing agent in the form of gas or aerosol through the mixture of the organic substance with the binder within the lower die. When the shaped article is desired to possess uniform strength throughout its entire volume, ventholes each fitted with a vent plug may be disposed at suitable positions in the upper die and the lower die so that the incoming curing agent will be enabled to permeate the mixture uniformly throughout its entire volume.

In this case, the ventholes to be bored through the upper die the lower die should be carefully distributed so that those in the upper die and those in the lower die will avoid aligning with each other. The uniform penetration of the curing agent may otherwise be ensured by forming a smaller number of ventholes in the discharge side die than in the gas inlet side die or by forming the ventholes in the discharge side die in a smaller cross-sectional area than those in the gas inlet side die.

Where the shaped article is desired to have a partially lower strength, required hardness distribution in the shaped article can be attained by decreasing the amount of the curing agent flowing to the portion of lower strength or having the ventholes distributed so that the curing agent will be prevented from flowing in that portion.

As described above, the method of this invention enables shaped articles to be manufactured with high productivity. This high productivity may be further enhanced by setting the die temperature at a level higher than the normal room temperature, by having the raw material heated in advance of their use in the apparatus of this invention, or by preheating the curing gas, for example.

The pattern die to be used in the manufacture of shaped articles of organic substance by the method of this invention may be a metal die, a resin die, or a wooden die. The selection of the material of this die depends mainly on the strength which the shaped article is expected to acquire. While the strength of the shaped article can be increased by increasing the amount of the binder to be added to the organic substance, it can also be increased by increasing the compressive force to be exerted on the aforementioned mixture. When the compressive force to which the die is exposed exceeds about 10 $kg/cm^2$, the die must be metal product. So far as the compressive force is not expected to exceed about 6 $kg/cm^2$, the die may be a resin product or wooden product. As shown in the following working examples, the method of shaping contemplated by this invention produces shaped articles which fully satisfy practical applications in terms of form and strength. Thus, this method obviates the necessity of using an expensive metal die. When the method is desired to produce shaped articles of high strength by using the binder particularly in a small amount, the metal die may be used with the compressive force safely increased to a level exceeding 10 $kg/cm^2$.

Now, this invention will be described more specifically below with reference to working examples.

EXAMPLE 1

A mixed composite of hemp (having an average fiber length of 30 mm) and ground rice hull (having an average particle diameter of 80 mesh) were mixed with a polyol (product of Hodogaya Chemical Industry Co. marketed under trademark designation of Isocure Part I 306) and polyisocyanate (product of Hodogaya Chemical Industry Co. marketed under trademark designation of Isocure Part II 600) as a binder. As a curing gas, triethylamine (product of Daicel Chemical Industry Co.) was used. With an apparatus illustrated in the drawing, the produced mixture was shaped. The shaping conditions used in this case and the results of the test of the produced shaped article for physical properties are shown in Table 1. The results of bending strength indicated were obtained by the method of JIS A-5905 and those of tensile strength by the method of JIS P-8113 respectively.

COMPARATIVE EXAMPLE 1

A mixed composite of pulp fibers (having an average fiber length of 5 mm) and pulp powder (having an average particle diameter of 60 mesh) was mixed with sodium silicate (product of Toa Chemical Co. marketed under trademark designation of Aron Set No. 2) as a binder. As a curing agent, carbon dioxide gas was used. With the apparatus illustrated in the drawing, the resultant mixture was shaped. The shaping conditions used in this case and the results of the test of the produced shaped article for physical properties are shown in Comparative Table 1.

EXAMPLE 2

Polyester fibers (having an average fiber length of 5 mm and a fiber thickness of 4 d) were mixed with isocyanate prepolymer (product of Gunei Chemical Co. marketed under trademark designation of UL-4800) incorporating in advance 20% of acetone as a binder. As a curing gas, triethylamine was used. With the apparatus illustrated in the drawing, the resultant mixture was shaped. The shaping conditions used in this case and the results of the test of the produced shaped article for physical properties are shown in Table 2.

EXAMPLE 3

A mixed composite of crushed waste paper (having an average fiber length of 2 mm) and ground rice hull (having an average particle diameter of 80 mesh) was mixed with a polyol (product of Hodogaya Chemical Industry Co. marketed under trademark designation of I 306) and polyisocyanate (product of Hodogaya Chemical Industry Co. marketed under trademark designation of II 600) as a binder. As a curing gas, triethylamine (product of Daicel Chemical Industry Co.) was used. With the apparatus illustrated in the drawing, the resultant mixture was shaped. The shaping conditions used in this case and the results of the test of the produced shaped article for physical properties are shown in Table 3.

EXAMPLE 4

Pulp fibers (having an average fiber length of 7 mm) were mixed with a polyol (product of Hodogaya Chemical Industry Co. marketed under trademark designation of Isocure Part I 306) and polyisocyanate (product of Hodogaya Chemical Industry Co. marketed under trademark designation of Isocure Part II 600). As a curing gas, triethylamine (product of Daicel Chemical Industry Co.) was used. With the apparatus illustrated in the drawing, the resultant mixture was shaped. The shaping conditions used in this case and the results of the test of the produced shaped article for physical properties are shown in Table resultant mixture was shaped. In this case, the compressive force was minimized so that the mixture 50 mm in thickness would form a shaped article 40 to 48 mm in thickness. The shaping conditions used in this case and the results of the test of the produced shaped article for physical properties are shown in Table 4.

As described above, this invention is constructed to effect manufacture of a shaped article of organic substance by mixing a material containing the organic substance with a binder, filling a die with the resultant mixture, compressing this mixture in the die, and forcing a liquid curing agent through the compressed mixture thereby solidifying the organic substance. Owing to this construction, the compressive force exerted within the die can be decreased below the level normally required and the die itself can be an inexpensive product of resin or wood. And the device for application of compressive force can be in a smaller size than is normally required. Moreover, the die is not required to be heated at all. The process of heating the die which has been indispensable to the conventional method is no longer necessary. This fact contributes to decreasing the production cost. The retention time of the curing agent in the compressed mass is very small, falling on the order of several seconds to some tens of seconds. Consequently, the productivity is improved to a great extent.

TABLE 1

| Run No. | 1 | 2 | 3 | 4 |
|---|---|---|---|---|
| Shaping conditions | | | | |
| Hemp (g) | 20 | 20 | 50 | 50 |
| Ground rice hull (g) | 80 | 80 | 50 | 50 |
| Part I (g) | 30 | 15 | 30 | 15 |
| Part II (g) | 30 | 15 | 30 | 15 |
| Compressive force (kg/cm$^2$) | 5.0 | 3.0 | 5.0 | 5.0 |
| Retention time of curing gas (sec.) | 5 | 5 | 5 | 5 |
| Test results | | | | |
| Thickness (mm) | 4.5 | 5.5 | 4.5 | 4.5 |
| Density (g/cm$^3$) | 0.75 | 0.60 | 0.71 | 0.65 |
| Bending strength (kg/cm$^2$) | 89.1 | 33.4 | 145.2 | 85.2 |
| Tensile strength (kg/cm$^2$) | 64.7 | 25.7 | 122.5 | 70.3 |

COMPARATIVE TABLE 1

| Run No. | 1 | 2 | 3 | 4 |
|---|---|---|---|---|
| Shaping conditions | | | | |
| Pulp fibers (g) | 20 | 20 | 50 | 50 |
| Pulp powder (g) | 80 | 80 | 50 | 50 |
| Aron Set No. 2 (g) | 80 | 60 | 80 | 60 |
| Compressive force (kg/cm$^2$) | 5.0 | 3.0 | 5.0 | 5.0 |
| Retension time of curing gas (sec.) | 10 | 10 | 10 | 10 |
| Test results | | | | |
| Thickness (mm) | 4.5 | 5.5 | 4.5 | 4.5 |
| Density (g/cm$^3$) | 0.84 | 0.72 | 0.83 | 0.66 |
| Bending strength (kg/cm$^2$) | 66.7 | 29.7 | 78.5 | 59.9 |
| Tensile strength (kg/cm$^2$) | 32.9 | 16.6 | 56.9 | 33.8 |

TABLE 2

| Run No. | 1 | 2 | 3 | 4 |
|---|---|---|---|---|
| Shaping conditions | | | | |
| Polyester fibers (g) | 100 | 100 | 100 | 100 |
| UL-4800 (g) | 20 | 20 | 20 | 10 |
| Compressive force (kg/cm$^2$) | 50 | 30 | 50 | 30 |
| Retention time of curing gas (sec.) | 30 | 30 | 30 | 30 |
| Test results | | | | |
| Thickness (mm) | 3.0 | 3.0 | 3.0 | 3.0 |
| Density (g/cm$^3$) | 0.88 | 0.81 | 0.85 | 0.78 |
| Bending strength (kg/cm$^2$) | 218.6 | 97.3 | 148.8 | 65.8 |
| Tensile strength (kg/cm$^2$) | 83.4 | 45.1 | 76.8 | 44.2 |

TABLE 3

| Run No. | 1 | 2 | 3 | 4 |
|---|---|---|---|---|
| Shaping conditions | | | | |
| Crushed waste paper (g) | 30 | 30 | 70 | 70 |
| Ground rice hull (g) | 70 | 70 | 30 | 30 |
| Part I (g) | 20 | 10 | 20 | 10 |
| Part II (g) | 20 | 10 | 20 | 10 |
| Compressive force (kg/cm$^2$) | 5.0 | 3.0 | 5.0 | 5.0 |
| Retention time of curing gas (sec.) | 5 | 5 | 5 | 5 |
| Test results | | | | |
| Thickness (mm) | 5.0 | 6.0 | 5.0 | 5.0 |
| Density (g/cm$^3$) | 0.74 | 0.56 | 0.71 | 0.70 |
| Bending strength (kg/cm$^2$) | 84.1 | 41.5 | 89.4 | 47.7 |
| Tensile strength (kg/cm$^2$) | 35.8 | 17.9 | 38.7 | 20.2 |

TABLE 4

| Run No. | 1 | 2 | 3 | 4 |
|---|---|---|---|---|
| Shaping conditions | | | | |
| Pulp fibers (g) | 60 | 60 | 60 | 60 |
| Part I (g) | 30 | 20 | 20 | 10 |
| Part II (g) | 30 | 20 | 20 | 10 |
| Compressive force ($kg/cm^2$) | Minimal | Minimal | Minimal | Minimal |
| Retension time of curing gas (sec.) | 5 | 5 | 5 | 5 |
| Test results | | | | |
| Thickness (mm) | 48 | 46 | 44 | 40 |
| Density ($g/cm^3$) | 0.094 | 0.096 | 0.101 | 0.115 |

What is claimed is:

1. A method for the manufacture of a shaped article of an organic substance, comprising:

the step of mixing an organic substance as a raw material with a binder containing a polyol and an isocyanate, the step of filling a die with the resultant binder containing mixture, the step of compressing said mixture in the shape of said die, and the step of forcing a gaseous curing agent of triethylamine or dimethyl ethylamine through the compressed mixture within said die thereby chemically curing said binder and consequently solidifying the compressed mass at room temperature.

2. A method according to claim 1, wherein compressed air is blown into said die to purge the compressed mass after said mixture has been solidified.

* * * * *